United States Patent
Yin et al.

(10) Patent No.: US 6,352,315 B1
(45) Date of Patent: Mar. 5, 2002

(54) LOAD DEPENDENT BRAKING PRESSURE REGULATING DEVICE FOR RAILWAY VEHICLES

(76) Inventors: Zhaorong Yin, No. 312, Nanbalou, 2 Daliushulu, Haidian District, Beijing 10081 (CN); Yun-chang Wang, Room 1406, Building 17, No. 24 Huangsi Street, Xicheng District, Beijing 100011 (CN)

( * ) Notice: Subject to any disclaimer, the term of this patent is extended or adjusted under 35 U.S.C. 154(b) by 0 days.

(21) Appl. No.: 09/452,675

(22) Filed: Dec. 1, 1999

(30) Foreign Application Priority Data

Dec. 2, 1998 (CN) ..................................... 98 2 48895 U

(51) Int. Cl.[7] ................................................. B60T 8/18
(52) U.S. Cl. ..................................... 303/22.2; 303/22.7
(58) Field of Search ............................... 303/22.1, 9.69, 303/22.5, 22.6, 22.7, 22.8; 105/199.3, 201; 188/195

(56) References Cited

U.S. PATENT DOCUMENTS

| | | | |
|---|---|---|---|
| 3,929,384 A | 12/1975 | Larsen | |
| 4,080,005 A | * 3/1978 | Engle | ........................ 303/22.6 |
| 4,202,583 A | 5/1980 | King | |
| 4,291,923 A | 9/1981 | Billeter | |
| 4,348,062 A | 9/1982 | Koenig | |
| 4,364,609 A | 12/1982 | Wickham | |
| 4,417,767 A | 11/1983 | Billeter | |
| 4,423,909 A | * 1/1984 | Page et al. | ................. 303/22.2 |
| 4,498,712 A | 2/1985 | Hart | |
| 4,583,790 A | 4/1986 | Scott | |
| 4,801,179 A | * 1/1989 | Hintner | ................. 303/22.6 X |
| 4,824,179 A | * 4/1989 | Rees | ......................... 303/22.7 |
| 5,052,761 A | 10/1991 | Thony | |
| 5,340,203 A | * 8/1994 | Gowda | ...................... 303/22.5 |
| 5,386,783 A | * 2/1995 | Rhen et al. | .............. 105/199.3 |
| 5,735,580 A | * 4/1998 | Klink | ........................ 303/22.6 |

FOREIGN PATENT DOCUMENTS

| | | |
|---|---|---|
| CN | 85 1 00675 | 4/1985 |
| EP | 0 246 730 | 11/1987 |
| GB | 1 461 449 | 1/1977 |

OTHER PUBLICATIONS

English Abstract of SU 895 761 (Jan. 7, 1982).

* cited by examiner

*Primary Examiner*—Douglas C. Butler
*Assistant Examiner*—Melanie Torres
(74) *Attorney, Agent, or Firm*—Robin, Blecker & Daley

(57) ABSTRACT

A load dependent braking pressure regulating device for railway vehicles comprises an auxiliary reservoir (8), a brake cylinder (10) and a control valve (9). A regulating valve (2), a sensor valve (4), a triggering board transmission mechanism (5) and a stop disc (6) are provided between the control valve (9) and the brake cylinder (10). A triggering head at the lower end of the stop disc (6) is right opposite the center of the triggering board of said transmission mechanism (5). The sensor valve (4) is connected with the control valve (9), the regulating valve (2), the brake cylinder and the pressure reduction reservoir(7). The device according to the present invention can prevent flat wheel accidents, enhance train operation safety, reduce operation cost and reduce the longitudinal impact between differently loaded cars in a train upon braking.

9 Claims, 4 Drawing Sheets

LOAD DEPENDENT BRAKING PRESSURE REGULATING DEVICE FOR RAILWAY VEHICLES

FIELD OF THE INVENTION

The present invention relates to empty and load brake devices for railway vehicles and is particularly concerned with a load dependent braking pressure regulating device for railway vehicles.

BACKGROUND OF THE INVENTION

Various types of empty and load brake devices have been developed in the former USSR, Germany, Japan and the USA. These known devices can adjust the brake cylinder air pressure in two steps, multi-steps or in a stepless manner. Some of them have been once used in China but failed very soon due to their incapability of meeting the actual conditions in China and hence, have been ruled out of the Chinese market; and some of them cannot match the brake control valves to which two braking pressures are directly applied and hence are difficult to be applied and disseminated in China. Therefore, manually manipulated two-step empty-load switching devices have been widely using in China. In use, such switching devices are sometimes wrongly switched or forgotten to be operated, leading to railway wheel slide. With the development of railway transportation and freight car manufacturing technology, the two-step empty and load brake device often than not results in flat wheels of the freight cars due to increased pay load, decreased empty weight and increased load and empty ratio. Under the condition of empty car or partially loaded car, the car brake rate is too high. When the wheel/rail adhesion coefficient drops due to weather and environment changes, the tread of wheels tends to be damaged. With the development of heavy haul train operation and increased train speed, accidents of flat wheels are increasingly happened, thus threatening operation safety and increasing the maintenance and operation cost.

SUMMARY OF THE INVENTION

Accordingly, it is an object of the present invention to provide a load dependent braking pressure regulating device for railway vehicles which can match the performance of the control valve, to which two pressures are directly applied, such as 120 valves, GK valves and ABDW valves. The device according to the present invention can replace the existing manually operated devices for switching between empty and load and the safety valves; not only ensures sufficient braking force under different loads or no load, but also effectively presents flat wheel accidents resulted from excessive brake force which is greater than that the wheel/rail adhesion can handle, whereby the brake and release performance of the train brake system is improved, the demands by heavy haul trains and speed raising are met and the safety of train operation and the quality of transportation are, enhanced.

To achieve the above object of the present invention, there is provide a load dependent braking pressure regulating device for railway vehicles comprising an auxiliary reservoir for storing pressurized air from a train pipe; a brake cylinder; and a control valve operated by means of the pressure difference between the train pipe and the auxiliary reservoir in such a manner that the pressurized air from the auxiliary reservoir enters the brake cylinder through the control valve upon braking and that the pressurized air from the brake cylinder is discharged to the atmosphere through the control valve when the brake cylinder is released, characterized in that a regulating valve, a sensor valve, a triggering board transmission mechanism and a stop disc are provided between the control valve and the brake cylinder, a triggering head provided at the lower end of the stop disc being directly opposite the center of a triggering board of the triggering transmission mechanism, and the sensor valve being connected through pipes with the control valve, the regulating valve, the brake cylinder and the pressure reduction reservoir respectively.

The load dependent braking pressure regulating device according to the present invention has the following advantageous effects over the conventional technology:

1) The device according to the present invention can adjust the brake cylinder air pressure steplessly and automatically in accordance with the car load and can replace the existing manually operated two-step empty and load switching mechanism and its safety valve so that the control between empty and load can be automatized, and the consumption of braking air and the time for recharging braking air can be reduced.

2) The device according to the present invention can reduce the brake cylinder air pressure and brake rate under empty and partially loaded conditions, keep an even brake rate under different loads, which is always greater than the brake rate of a fully loaded car, and to ascertain a safe brake distance;

3) With the device according to the present invention, the brake force in empty or partially loaded condition will be kept smaller than the wheel/rail adhesion so as to prevent accidents of flat wheels, reduce abnormal wheel wear and car maintenance work, raise the car utilization rate and transportation efficiency, reduce the damages to rail connections, bridges and car bearings due to flat wheels, thus improving the safety of train operation;

4) Because of the uniform brake rate under different car loads of one train, the longitudinal impact between differently loaded cars in one train at brake application will be reduced. Because of this device matching neatly with the two-pressure directly-controlled brake valve, the train pipe effective pressure reduction under different loads is more or less the same, the release of each car in a mixed consist train is more uniform, the longitudinal release impact between cars can be effectively reduced when the brake system is operated or released. The reduction of longitudinal brake and release impact between cars is conducive to improvement of freight transportation quality and safety;

5) The device is well located, accurate in weight measurement, less influenced by side-roll, vibration, tilting on curve and unbalanced loading.

6) The device matches neatly with the two-pressure directly-controlled brake valve. The brake and release performance under different loads tends to be the same, reduces the release time of empty cars and partially loaded cars. It is conducive to operate long and heavy haul trains and increase the freight train operation speed.

7) The device is simple in structure and reliable in operation, and needs less maintenance. Since all moving parts of the sensor valve and the regulating valve are sealed with Y-shaped rubber seals with no wearable parts, the maintenance period is long.

8) The device makes it possible to have no mechanical connection such as pipes between the car body and the truck. So during maintenance, the car body can be raised and separated from the truck without dismantling any parts.

9) The device is adaptable to various kinds of cars, very strong in adaptability;

10) The application and dissemination of the device will bring up significant economical and social benefits to the railway industry.

BRIEF DESCRIPTIONS OF DRAWINGS

DETAILED DESCRIPTION OF THE PREFERRED EMBODIMENTS

Hereinafter, an embodiment of the present invention will be described with reference to the drawings.

Figure 1:
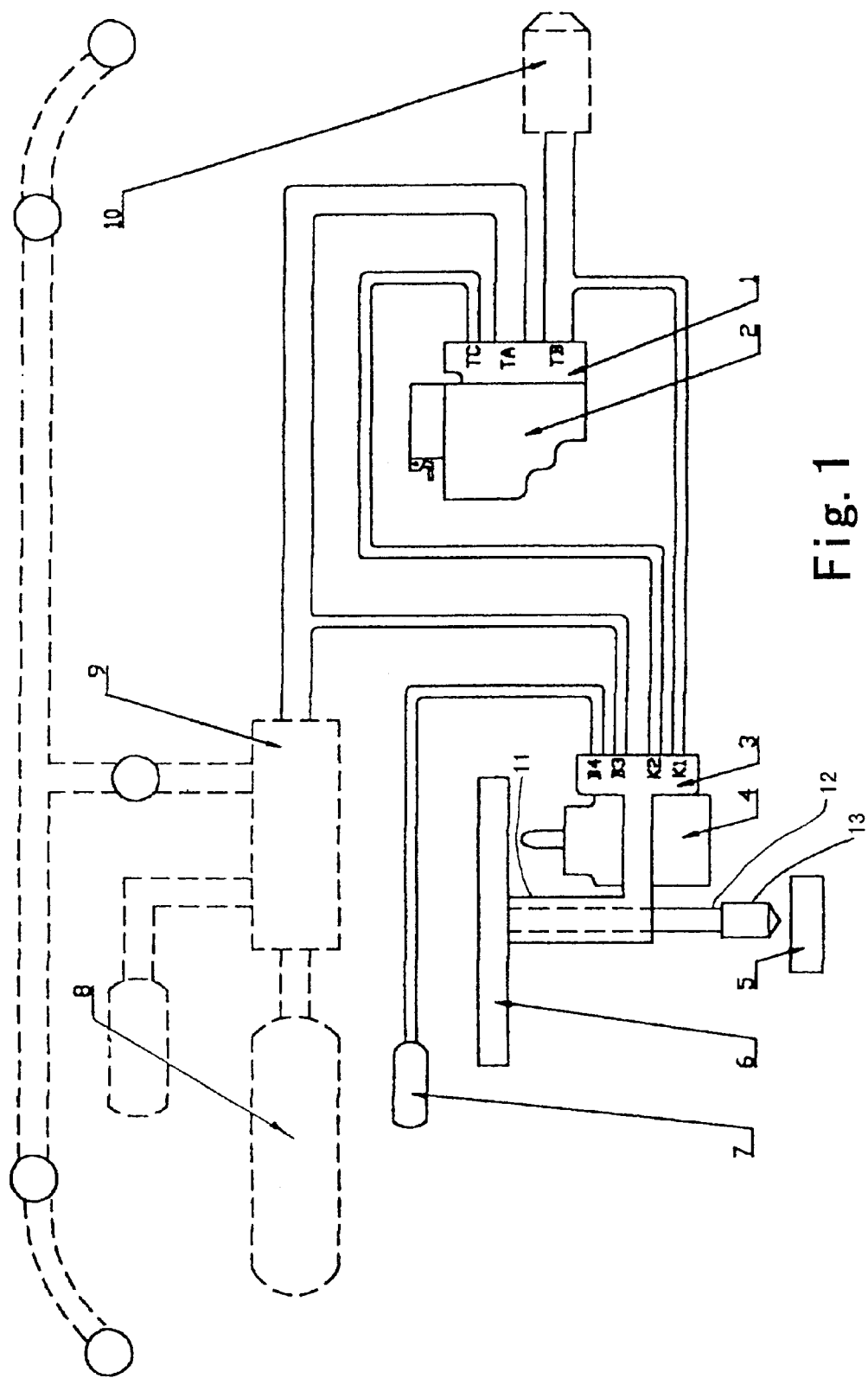
FIG. 1 is a schematic illustration of the device according to the present invention.

As shown in FIG. 1, a sensor valve 4 and a stop disc 6 are fixed on a support member 3, which is installed in the middle of the center beam of the car body near the center plate. A triggering head provided at the lower end of the stop disc 6 is directly opposite the center of the triggering board 28 of a transmission mechanism 5.

Figure 2:
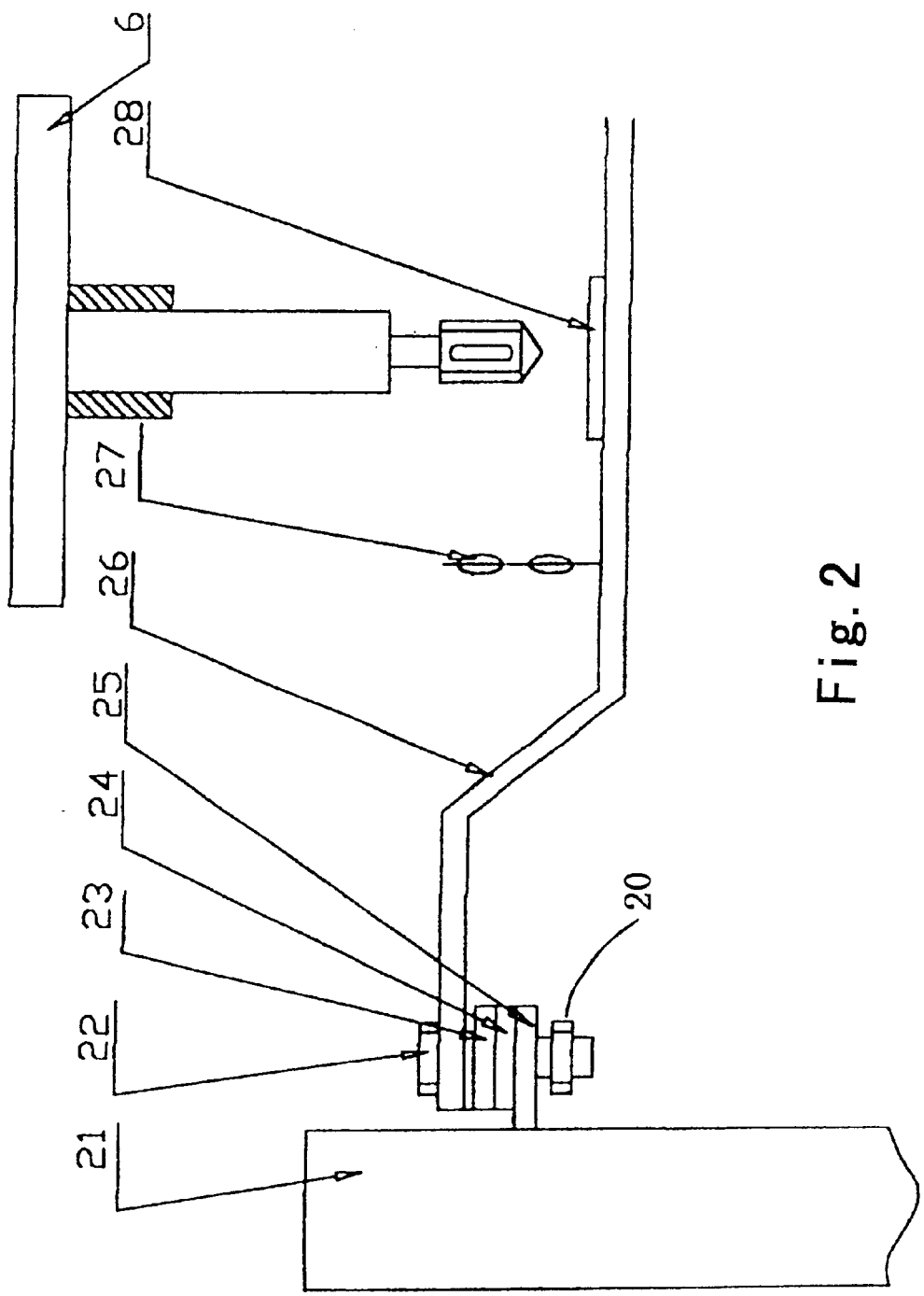
FIG. 2 is a schematic illustration of the triggering board transmission mechanism used in the device according to the present invention.
Figure 3:
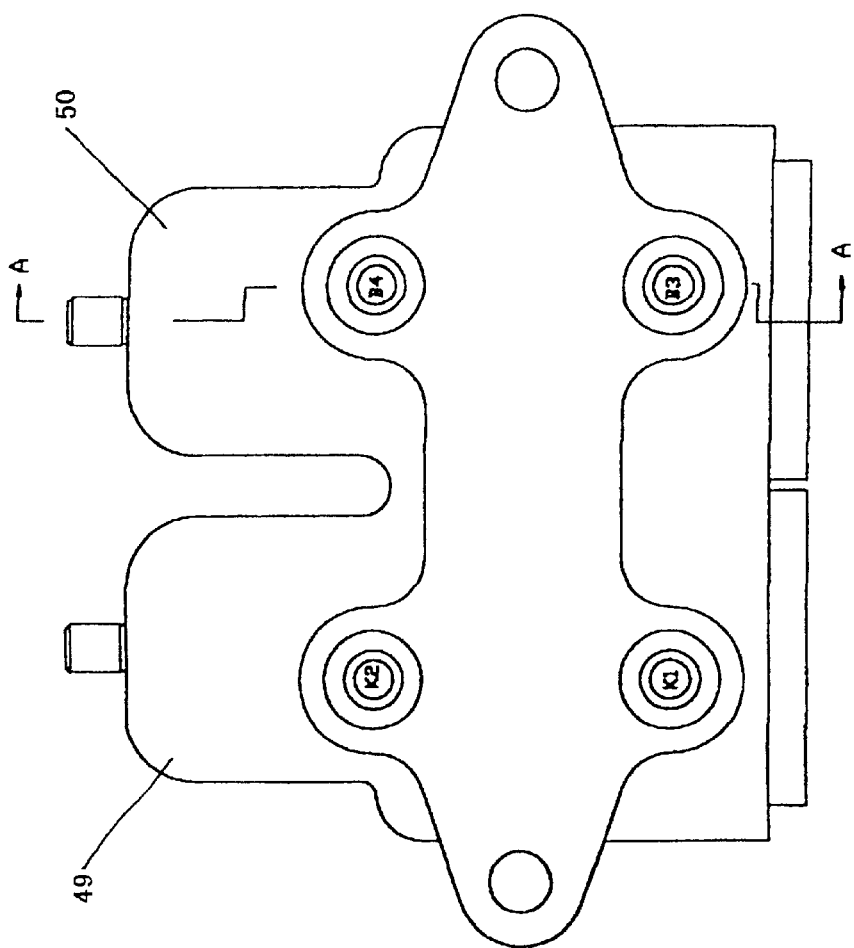
FIG. 3 is a front view of the sensor valve used in the device according to the present invention.

The triggering board transmission mechanism 5 is shown in FIGS. 2 and 3 and the triggering board 28 is kept at a constant height from the rail top, which is used as the reference for weighting the car load by means of the compression of bolster springs or the axlebox springs. The transmission mechanism 5 is different in structure for different types of trucks. The transmission mechanism as shown in FIG. 2, which can be used for 3-piece trucks, has a steel crosstie 26 extending parallel to the bolster. The center of the triggering board 28 is right opposite the triggering head of the stop disc. The crosstie 26 supported at ends by respective bearing pads 25 provided in the sideframe of the truck. Between the pad and the end of the crosstie 26 are provided a wearing plate 23 and an adjustment plate 24. Each of the bearing pad 25, the wearing plate 23 and the adjustment plate 24 has an oblong hole. A bolt 22 extends through the end of the crosstie 26 and these oblong holes in the wearing plate 23 and the adjustment plate 24. There is a gap between the pad 25 and a nut 20 screwed at the lower end of the bolt 22 so that the crosstie 26 can be moved in the lateral direction of the railway vehicle. Therefore, the crosstie 26 will not be subject to any tension or compression. The adjustment plate 24 is used to adjust the level of the crosstie 26. The crosstie 26 is supported by the truck sideframes 21 so as to keep a constant height from the rail top. A safety chain 27 is suspended on the truck bolster and connected with the crosstie to prevent the crosstie from any accidental falling off. Other types of transmission mechanism can be used for trucks in which a crosstie cannot be installed.

The support member 3 is a precise steel casting and is fixed to the center beam of the car body near the center plate by means of bolts. The support member 3 is provided with a vertical sleeve 11 for mounting the stop disc 6, and the sensor valve 4 is fixed to the support member 3 by bolts.

A round bar 12 extends from the center of the bottom surface of the stop disc 6 into the sleeve 11 of the support member 3 and can be moved up and down in the sleeve 11. A hexagonal head 13 is screwed on the lower end of the bar 12. The position of the hexagonal head 13 can be adjusted by rotating it so that, when the car is empty, the bottom surface of the stop disc 6 rests on the top of the sleeve 11 of the support member 3 and the hexagonal head 13 just contacts triggering board 28 of the transmission mechanism 5. Under this condition, the hexagonal head is locked on the bar 12 in a known manner, and the air pressure of brake cylinder 10 and that of the pressure reduction reservoir 7 for braking empty car are determined. Thereafter, the distance between the stop disc 6 and the rail top will not be changed. When the pay load is increased, the bolster springs are compressed, the support member 3 is moved down with the car body, and the distance between the top of the sleeve 11 of the support member 3 and the stop disc 6 increases along with the increase of the load. Variations of said distance indicate the changes of the pay load. The load of the car or the change of spring compression will be converted into a change of the distance between the triggering rods of the sensor valve 4 and the stop disc 6 by means of the stop disc 6 and the support member 3.

Figure 4:
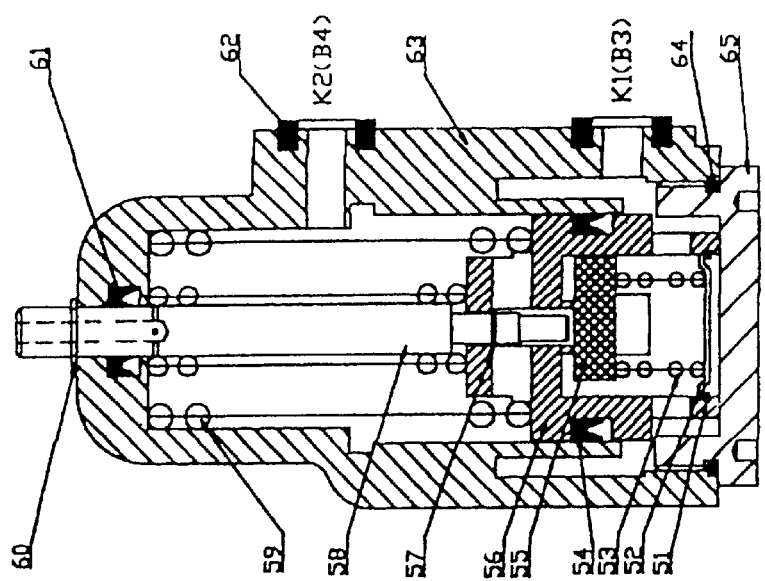
FIG. 4 is a sectional view of the sensor valve taken along line A—A of FIG. 3.

The sensor valve 4 consists of two parts formed in one valve body, which are substantially the same in structure with the only exception that their compression spring 59 have different spring rates. The structure of the parts 49 and 50 of the sensor valve 4 is shown in FIGS. 3 and 4. A piston-triggering rod assembly consists of a spring ring 51, a check valve spring 53, Y-shaped seal 54, a check valve 55, a piston 56, a spring ring 57 and a triggering rod 58, which can be moved up and down. The casing of sensor valve 4 consists of a valve cover 65, an O-ring seal 64, a Y-shaped seal 61 and a valve body 63. Reference sign "60" denotes a spring ring and "62" denotes a rectangular seal. The piston 56 divides the valve chamber into two parts, the upper chamber and the lower chamber. The piston 56 and hence the triggering rod 58 are biased towards the lowest position by the compression spring 59 the upper chamber is open to the atmosphere through a vent hole in the triggering rod 58. Under the action of the check valve spring 53, the check valve 55 is closed. When pressurized air enters the lower chamber, the piston-triggering rod assembly is pushed up by the increasing pressure, and at the same time, the compression spring 59 is compressed. Upon upward movement of the triggering rod 58, its radial vent hole passes the Y-shaped seal 61, and the release passage from the upper chamber to the atmosphere is closed. When the air pressure in the lower chamber increases to a pre-determined value, the up-moving triggering rod 58 is stopped by the stop disc 6. The air pressure in the lower chamber builds up and the piston 56 continues to move up. The check valve 55 is moved away from the valve opening by the lower end of the triggering rod 58. The pressurized air in the lower chamber flows into the upper chamber through the opened check valve. The check valve 55 will be closed again when a balance is achieved between the forces acted on the top and bottom surfaces of the piston 56 respectively. When the air pressure in the lower chamber decreases, the piston 56 and hence its triggering rod 58 are moved down. When the triggering rod 58 approaches its lowest position, the pressurized air in the upper chamber is discharged to the atmosphere through the vent hole in the triggering rod 58.

An inlet hole K1 and an outlet hole K2 are provided in the control part 49 The control part 49 and the regulating valve 2 jointly control the air pressure going into the brake cylinder 10 so that the air pressure in the brake cylinder 10 increases according to the increase of the pay load. An inlet hole B3 and an outlet hole B4 are provided in the compensation part 50, which independently controls the air pressure in the pressure reduction reservoir 7 so that the air pressure in the pressure reduction reservoir 7 decreases along with the increase of the pay load. In this manner, the air pressure in the auxiliary reservoir 8 when the car is empty or partially loaded can the maintained nearly the same as that when the car is fully loaded, upon braking.

Figure 6:
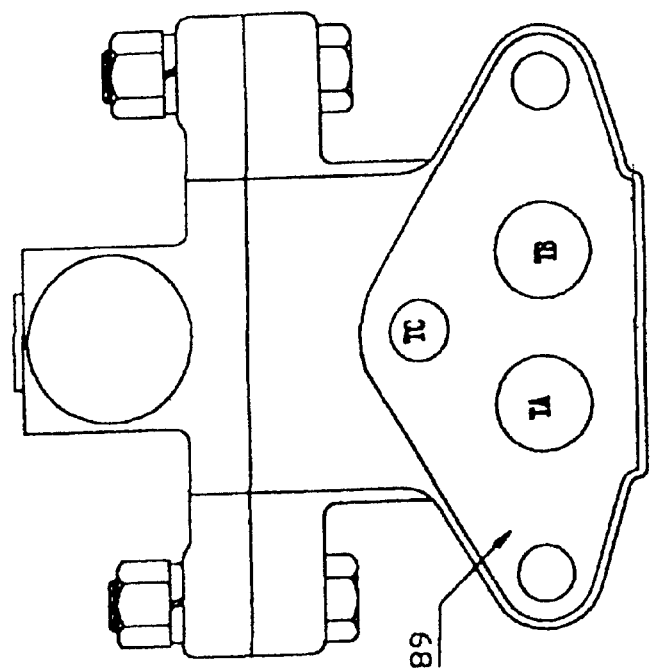
FIG. 6 is a right view of the regulating valve used in the device according to the present invention.
Figure 5:
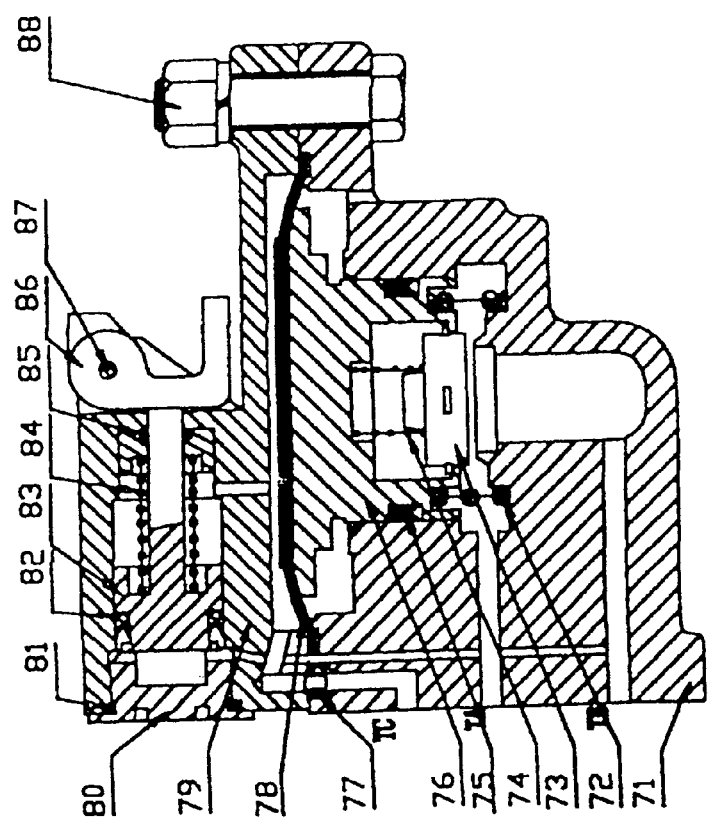
FIG. 5 is a sectional view of the regulating valve used in the device according to the present invention.

The structure of the regulating valve 2 is shown in FIGS. 5 and 6. A hole TA provided in the regulating valve 2 is communicated with the brake hole of the control valve through a hole in the valve seat 1 and the pipe line, and with the hole B3 through a hole in the support member 3. A hole TB provided in the regulating valve 2 is communicated with the brake cylinder 10 through a hole in the valve seat 1, and with the hole K1 provided control part 49 of in the sensor valve 4 through a hole in the support member 3. A hole TC provided in the regulating valve 2 is communicated with the hole K2 in the control part 49 through a hole in the valve seat 1 and the pipe line. The regulating valve 2 comprises a valve body 71, a compression spring 72, a check valve 73, a check valve spring 74, a Y-shaped seal 75, a piston 76, a seal washer 77, a diaphragm 78, a valve cover 79, a rear stop 80, an O-ring seal 81, a Y-shaped seal 82, a piston rod 83, a pressure indicating spring 84, a Y-shaped seal 85, an indicator member 86, a dowel 87, a bolt 88 and a triangle seal washer 89. During release, the piston 76 is biased towards its upmost position by the compression spring 72 and therefore the check valve 73 is moved off the bottom valve opening, the check valve 73 being in its open state, and the hole TA is communicated with the hole TB. When the force acted on the top surface of the piston 76 through the diaphragm 78 by the pressurized air entering the area above the diaphragm 78 is greater than the force acted on the bottom surface of the piston by the compression spring 82 and the pressurized air, the piston 76 and hence the check valve 73 are moved downward and the check valve 73 is closed so that the hole TB is communicated with the brake cylinder 10 and the air pressure in the brake cylinder 10 is kept unchanged. On the top of the valve cover 79 is an empty-load indicator of cylinder-piston type. When the brake cylinder 10 is in non-operation state, a compression spring 84 provided on the rod of the piston 83 will push the piston 83 to its left position (as shown in FIG. 5) in which position an indicator member 86 droops. The right side of the piston 83 is communicated with the area above the diaphragm 78 and the left side of the piston. 83 is communicated with the brake cylinder 10 through the hole TB. When the car is fully loaded and the brake cylinder is its operation state, the piston 83 is pushed by the air pressure of the brake cylinder 10 toward its right position against the force of the compression spring 74 and the indicator member 86 turns about its pivot 87 anticlockwise by 90°; when half loaded, the indicator member 86 turns anticlockwise about its pivot 87 by 45° in a similar manner; and when empty, the indicator member 86 stays where it is. The indicator facilitates to determine brake failures. If the indicator member 86 turns by 90° upon braking when the car is empty, it shows that the air pressure of the brake cylinder is actually for a loaded car, and the brake system faults must be rooted out to avoid wheel slide.

The valve seat 1 for the regulating valve 2 is installed in the middle part of the car body under the side beam of the car body and near brake cylinder 10. The valve seat 1 is connected with the flanges of pipelines.

All lines connecting various valves are of seamless steel pipes and connected with flanges and sealed with rectangular seals.

When the brake control valve 9 has no pressurized air or is released, the check valve 73 in the regulating valve 2 starts to open, the indicator member 86 will droop, the brake cylinder 10 with all pipelines connected to it is communicated with the atmosphere through the regulating valve 4 and the release passage of the control valve 9. The piston 56 and the triggering rod 58 in the control part 49 of the sensor valve 4 are at the lowest position, and the check valve 55 is closed. The area above the diaphragm 78 in the regulating valve 2 is communicated with the upper chamber of the control part 49 of the sensor valve 4 through the hole TA and K2, and with the atmosphere through the center hole of the triggering rod 58. The piston 56 and the triggering rod 58 in the compensation part 50 of the sensor valve 4 are also in their lowest positions and the check valve 55 is closed. The lower chamber of compensation part 50 of the sensor valve 4 is now communicated with the atmosphere through the hole B3 and the release passage of the brake control valve 9 and the upper chamber of the compensation part 50 of the sensor valve 4 is communicated with the pressure reduction reservoir 7 through the hole B3, and with the atmosphere through the center hole of the triggering rod 58.

Upon braking in empty or partially loaded condition, the pressurized air from the brake hole of the control valve 9 is divided into two flowing paths: one going to the hole TA of the regulating valve 2 and the other to the hole B3 of compensation part 50 of the sensor valve 4. The pressurized air entering the regulation valve 2 goes through the opened check valve 73 and into the brake cylinder 10 and the hole K1 of the control part 49 of the sensor valve 4 to charge them. The pressurized air entering the control part 49 of the sensor valve 4 pushes the piston 56 and the triggering rod 58 to move up for measuring the load by means of the displacement of the triggering rod 58. When the triggering rod 58 is stopped by the stop disc 6, the piston 56 continues moving up, and the triggering rod 58 pushes the check valve 55 open. The pressurized air in the lower chamber flows into the upper chamber through the valve opening and then flows into the area above the diaphragm 78 in the regulating valve 2. When the air pressure in said area above the diaphragm 78 is increased to a predetermined level, the piston 76 will be moved down until the check valve 73 is closed. The air pressure in the brake cylinder 10 is thereby kept constant. The indicator member 86 on the regulating valve cover droops in empty condition, turns by 45° in half loaded condition and turns by 90° in fully loaded condition. The pressurized air entering the hole B3 of the compensation part 50 of the sensor valve 4 pushes the piston 56 to compress the spring 59 and pushes the triggering rod 58 upward to measure the load by means of the displacement of the triggering rod 58. When the radial discharge hole in the triggering rod 58 passes the seal 61, the discharge passage of the upper chamber is closed. When the triggering rod 58 contacts and is stopped by the stop disc 6, the piston 56 continues to move up, and the check valve 55 is opened by the lower end of the triggering rod 58 so that the pressurized air from the lower chamber flows into the upper chamber and further flows into the pressure reduction reservoir 7 to charge it. When the balance between the forces acted on the top and bottom surfaces of the piston 56 respectively is achieved, the check valve 55 is closed again and the air pressure in the pressure reduction reservoir 7 will be kept constant.

Upon braking in empty and partially loaded conditions, when the train pipe is charged and the brake is released, the brake hole of the brake control valve 9 is communicated with the atmosphere through the release passage in the control valve. The pressurized air in the connection pipes between the brake hole of the brake control valve 9 and the regulating valve 2 and between the brake hole and the compensation part 50 of the sensor valve 4 is discharged to the atmosphere through the brake control valve 9. When the air pressure drops to a level lower than that of the brake cylinder 10, the check valve 73 is opened and the pressurized air in the brake cylinder 10 is discharged to the atmosphere through the check valve 73 of the regulating valve 2 and the release passage of the brake control valve 9. The regulating valve 2 and the control part 49 of the sensor valve 4 restore to their original released state with the triggering rod 58 retracted and the indicator member 86 drooping. At the same time, the piston 56 in the compensation part 50 of the sensor valve 4 is moved down, the triggering rod 58 is retracted and the pressurized air in the pressure reduction reservoir 7 is discharged to the atmosphere through the discharge hole of the triggering rod 58.

Upon braking in fully loaded condition, the trigger rods 58 of the control part 49 and of the compensation part 50 of the sensor valve 4 extend out but cannot touch the stop disc 6. Therefore, the check valves 55 in the control part 49 and in the compensation part 50 are closed all the time, and the pressurized air cannot enter the pressure reduction reservoir 7 and the area above the diaphragm 78 in the regulating valve 2 so that the check valve 73 of the regulating valve 2 is open all the time and the air pressure in the brake cylinder 10 is completely under the control of the brake control valve 9. The indicator member 86 turns by 90°, indicating the fully loaded condition.

When released in the fully loaded conation, the pressurized air in the brake cylinder 10 is discharged to the atmosphere via the release passage in the brake control valve 9 so that the indicator member 86 droops again, and the regulating valve 2 and the sensor valve 4 restore to their original released conditions.

What is claimed is:

1. A load dependent braking pressure regulating device for railway vehicles, comprising an auxiliary reservoir (8) for storing pressurized air from a train pipe; a brake cylinder (10); and a control valve (9) operated by means of the pressure difference between the train pipe and the auxiliary reservoir (8) in such a manner that the pressurized air from the auxiliary reservoir (8) enters the brake cylinder (10) through the control valve (9) upon braking and that the pressurized air from the brake cylinder (10) is discharged to the atmosphere through the control valve (9) when the brake cylinder (10) is released, characterized in that a regulating valve (2), a sensor valve (4), a triggering board transmission mechanism (5) and a stop disc (6) are provided between the control valve (9) and the brake cylinder (10), a triggering head provided at the lower end of the stop disc (6) being directly opposite the center of a triggering board (28) of the triggering transmission mechanism (5), and the sensor valve (4) being connected through pipes with the control valve (9), the regulating valve (2), the brake cylinder (10) and a pressure reduction reservoir (7) respectively;

said device being further characterized in that said sensor valve (4) and said stop disc (6) are installed on a support member (3), a round bar (12) extends from the bottom surface of the stop disc (6) into a vertical sleeve of said support member (3) and can move up and down in said sleeve.

2. A load dependent braking pressure regulating device for railway vehicles according to claim 1, characterized in that said sensor valve (4) comprises a control part (49) and a compensation part (50) which are of the same structure, an inlet hole (K1) of said control part (49) being connected with the brake cylinder (10), an outlet hole (K2) of said control part (49) being connected with the regulating valve (2), an inlet hole (B3) of the compensation part (50) being connected with the control valve (9) and an outlet hole (B4) of the compensation part (50) being connected with the pressure reduction reservoir(7).

3. A load dependent braking pressure regulating device for railway vehicles according to claim 2, characterized in that each of said control part (49) and said compensation part (50) of said sensor valve (4) comprises a piston-triggering rod assembly, a compression spring means (59), a valve body (63) and a valve cover (65).

4. A load dependent braking pressure regulating device for railway vehicles according to claim 3, characterized in that the triggering rod (58) of the piston-triggering rod assembly is attached to the piston (56) by inserting a smaller end of the triggering rod (58) into the piston (58) and putting a spring ring (57) into a circumferential groove on the small end of the triggering rod (58), and a check valve (55), a check valve spring (53), a spring seat (52) and a spring ring (51) are provided in sequence on the valve opening of the piston (56).

5. A load dependent braking pressure regulating device for railway vehicles according to claim 1, characterized in that said regulating valve (2) comprises a valve body (71), a check valve (73), a check valve spring (74), a piston (76), a diaphragm (78), and an empty-load indicator.

6. A load dependent braking pressure regulating device for railway vehicles according to claim 5, characterized in that said empty-load indicator comprises a back stop (80), a piston rod (83), a compression spring (84) provided around said piston rod (83) and an indicator member (86) which is driven by said piston rod (83).

7. A load dependent braking pressure regulating device for railway vehicles, comprising an auxiliary reservoir (8) for storing pressurized air from a train pipe; a brake cylinder (10); and a control valve (9) operated by means of the pressure difference between the train pipe and the auxiliary reservoir (8) in such a manner that the pressurized air from the auxiliary reservoir (8) enters the brake cylinder (10) through the control valve (9) upon braking and that the pressurized air from the brake cylinder (10) is discharged to the atmosphere through the control valve (9) when the brake cylinder (10) is released, characterized in that a regulating valve (2), a sensor valve (4), a triggering board transmission mechanism (5) and a stop disc (6) are provided between the control valve (9) and the brake cylinder (10), a triggering head provided at the lower end of the stop disc (6) being directly opposite the center of a triggering board (28) of the triggering transmission mechanism (5), and the sensor valve (4) being connected through pipes with the control valve (9), the regulating valve (2), the brake cylinder (10) and a pressure reduction reservoir (7) respectively;

said device being further characterized in that said triggering board transmission mechanism (5) comprises a crosstie (26) which is supported on its opposite ends by a respective bearing pad (25) provided on an inner side of the truck sideframe of the railway vehicle; a wearing plate (23) and an adjustment plate (24) provided between each end of the crosstie (26) and the bearing pad (25); a bolt (22) which is inserted through the end of the cross tie (26) and oblong holes in the wearing plate (23) and adjustment plate (24) so that the crosstie (26) can be moved somewhat in the lateral direction of the railway vehicle.

8. A load dependent braking pressure regulating device for railway vehicles according to claim 7, characterized in that said crosstie (26) is provided with safety chains (27).

9. A load dependent braking pressure regulating device for railway vehicles, comprising an auxiliary reservoir (8) for storing pressurized air from a train pipe; a brake cylinder (10); and a control valve (9) operated by means of the pressure difference between the train pipe and the auxiliary reservoir (8) in such a manner that the pressurized air from the auxiliary reservoir (8) enters the brake cylinder (10) through the control valve (9) upon braking and that the pressurized air from the brake cylinder (10) is discharged to the atmosphere through the control valve (9) when the brake cylinder (10) is released, characterized in that a regulating valve (2), a sensor valve (4), a triggering board transmission mechanism (5) and a stop disc (6) are provided between the control valve (9) and the brake cylinder (10), a triggering head provided at the lower end of the stop disc (6) being directly opposite the center of a triggering board (28) of the triggering transmission mechanism (5), and the sensor valve (4) being connected through pipes with the control valve (9), the regulating valve (2), the brake cylinder (10) and a pressure reduction reservoir (7) respectively;

said device being further characterized in that the sensor valve (4) comprises first and second parts (49, 50), the first part (49) being connected through pipes to the regulating valve (2) and the brake cylinder (10) for cooperating with the regulating valve (2) to control the pressure of the air entering the brake cylinder (10), and the second part (50) being connected through pipes to the control valve (9) and the pressure reduction reservoir (7) for controlling the pressure of the air entering the pressure reduction reservoir (7).

\* \* \* \* \*